(12) United States Patent
Kennedy, III

(10) Patent No.: US 6,986,719 B2
(45) Date of Patent: *Jan. 17, 2006

(54) GOLF BALL WITH TEMPERATURE INDICATOR

(75) Inventor: Thomas J. Kennedy, III, Wilbraham, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/920,617

(22) Filed: Aug. 18, 2004

(65) Prior Publication Data

US 2005/0020387 A1 Jan. 27, 2005

Related U.S. Application Data

(63) Continuation-in-part of application No. 10/774,132, filed on Feb. 6, 2004, which is a continuation-in-part of application No. 10/006,507, filed on Dec. 6, 2001, now Pat. No. 6,780,127, which is a continuation-in-part of application No. 10/006,507.

(51) Int. Cl.
*A63B 37/12* (2006.01)
(52) U.S. Cl. ...................................... 473/378
(58) Field of Classification Search ................. 473/378
See application file for complete search history.

(56) References Cited

U.S. PATENT DOCUMENTS

| 3,980,300 | A | * | 9/1976 | Hornsby, Jr. ................. 473/594 |
| 4,028,118 | A | * | 6/1977 | Nakasuji et al. .......... 106/31.19 |
| 4,679,795 | A | | 7/1987 | Melvin et al. |
| 4,717,710 | A | | 1/1988 | Shimizu et al. |
| 4,911,451 | A | | 3/1990 | Sullivan et al. |
| 5,346,223 | A | * | 9/1994 | Hamada et al. .............. 473/354 |
| 5,394,824 | A | | 3/1995 | Johnson, Jr. |
| 5,503,583 | A | * | 4/1996 | Hippely et al. ................ 446/14 |
| 5,597,361 | A | | 1/1997 | Hope |
| 5,651,741 | A | * | 7/1997 | Masutani et al. ............ 473/200 |
| 5,805,245 | A | | 9/1998 | Davis |
| 5,823,891 | A | | 10/1998 | Winskowicz |
| 5,938,544 | A | | 8/1999 | Winskowicz |
| 6,012,992 | A | | 1/2000 | Yavitz |
| 6,585,555 | B2 | * | 7/2003 | Wong et al. ................. 446/153 |
| 6,780,127 | B2 | * | 8/2004 | Kennedy, III ............... 473/378 |

* cited by examiner

*Primary Examiner*—Raeann Gorden
(74) *Attorney, Agent, or Firm*—Michael A. Catania; Elaine H. Lo

(57) ABSTRACT

A golf ball having an integral means for sensing temperature whereby a golfer can readily determine if a golf ball is at the optimum temperature for play. For purposes of indicating temperature, the ball incorporates a thermochromic section and/or coating that will change color or become transparent or translucent at a predetermined temperature. The golf ball preferably comprises a liquid, gel or fluid filled core and/or core layer.

7 Claims, 3 Drawing Sheets

GOLF BALL WITH TEMPERATURE INDICATOR

CROSS REFERENCE TO RELATED APPLICATIONS

This application is a continuation-in-part of U.S. application Ser. No. 10/006,507, filed Dec. 6, 2001 now U.S. Pat. No. 6,780,127 and a continuation-in-part of U.S. application Ser. No. 10/774,132, filed Feb. 6, 2004.

FIELD OF THE INVENTION

The present invention relates to golf balls having integral temperature sensors or systems. The temperature sensor or system comprises a stamp or mark or a coating that changes color at a predetermined temperature, allowing a golfer to determine the approximate temperature of a golf ball and hence its suitability for play. Knowing the temperature of a golf ball is useful in that it allows a golfer to determine when a golf ball is capable of delivering maximum performance when struck by a golf club.

BACKGROUND OF THE INVENTION

Generally, golf balls are one of three types. A first type is a multi-piece wound ball wherein a vulcanized rubber thread is wound under tension around a solid or semi-solid core, and thereafter enclosed in a single or multi-layer covering of a tough, protective material. A second type of golf ball is a one-piece ball formed from a solid mass of a resilient material that has been cured to develop the necessary degree of hardness to provide utility. One-piece molded balls do not have a second enclosing cover. A third type of ball is a multi-piece non-wound ball that includes a liquid, gel or solid core of one or more layers and a cover having one or more layers formed over the core.

Attempts to improve and/or optimize performance characteristics in golf balls are typically directed toward achieving better feel when the ball is struck with a golf club, and also allowing for increased or optimum distance while at the same time adhering to the rules set forth by the United States Golf Association (U.S.G.A.) regarding the physical characteristics and performance properties of golf balls. These rules specify that the weight of a golf ball shall not be greater than 1.620 ounces, the diameter of the ball shall not be less than 1.680 inches and the velocity of the ball shall not be greater than 255 feet per second (250 feet per second with a 2% tolerance level). The U.S.G.A. rules also specify that the overall maximum distance a golf ball should travel (the "Overall Distance Standard" or "ODS") shall not exceed an average distance (in carry and roll) greater then 280 yards, plus a 6% tolerance level (296.8 yards total). Recently, a new ODS was instituted by the USGA. This new ODS methodology utilizes an indoor test range ("ITR") that consists of a ball launcher to launch the golf ball and a 70 foot tunnel into which the golf ball is launched. The tunnel consists of several stations of ballistic light screens. The ball launcher shoots the golf ball into the tunnel at specific, predetermined launch conditions (speed, spin rate and launch angle). The light screens are arranged such that the location of the golf ball may be determined on an X/Y/Z coordinate system. The new distance limit is 317 yards with a test tolerance of 3 yards, for a total of 320 yards maximum, when the golf ball is launched at 256 feet per second.

Over the years, attempts to improve characteristics such as feel and durability have centered on the materials used to form the various layers of a golf ball. Improvements in spin and distance characteristics are usually directed toward the actual construction and physical makeup of the golf ball. The use of one or more intermediate layers between a core and a cover layer to achieve such improvements is known in the art. The thickness and/or material hardness of each layer may also be varied in order to achieve a desired property.

In general, there is a natural transfer of energy that occurs within a golf ball when the ball is struck by a golf club. Energy is transferred from the club face to the golf ball cover, and then subsequently transferred through each layer beneath the cover. In solid non-wound golf balls employing spherical layers, energy transfer is generally a function of the thickness and material composition of a given layer. Therefore, varying either the thickness of a given layer and/or the material from which a layer is made affects the efficiency of energy transfer occurring within a golf ball and consequently affects the overall performance characteristics of that ball.

In wound, liquid or fluid core, and solid multi-layer golf balls, covers are placed around the preformed cores by techniques such as injection molding, compression molding, casting etc. When the cover is placed on the core, dimples are formed in the outer surface of the cover. This invention is concerned with the cover and/or coatings of a golf ball.

There exists a need for a golf ball design that assists a golfer in determining the approximate temperature of a golf ball and the ball's suitability for play in a given set of weather conditions. Knowing the ball temperature allows a golfer to determine when the ball is capable of delivering maximum performance characteristics, such as spin and overall distance. This is particularly true for golf balls having particular properties, such as a liquid or fluid-filled core. The fluid in the core will behave differently at different temperatures.

Golf balls having surfaces that incorporate dyes that change color due to an environmental change are known in the prior art. In this regard U.S. Pat. Nos. 5,938,544 and 5,823,891 to Winskowicz disclose golf balls which incorporate microencapsulated dyes in the surface thereof. These dyes change color upon prolonged exposure to water. The invention of these patents is useful for indicating when a golf ball becomes a "water ball" as a result of a prolonged immersion in water. The dyes in question change color upon immersion and remain colored; they do not revert back to their original color.

Thermochromic materials have been incorporated into the face of a golf club for purposes of indicating the point of impact between a golf ball and a golf club face. See, for example, U.S. Pat. No. 5,597,361 to Hope, and U.S. Pat. No. 5,805,245 to Davis, which discloses the use of thermochromic liquid crystals to indicate temperatures over different ranges. Similarly U.S. Pat. No. 5,394,824 to Johnson Jr. discloses the use of thermochromic dyes to indicate the point of impact of a tennis ball with a tennis court. Finally, the incorporation of thermochromic dyes into printing inks is disclosed in U.S. Pat. No. 4,717,710 to Shimizu et al.

None of the patents discussed above discloses the use of a layer of a thermochromic material on the surface of a golf ball for purposes of indicating the temperature of said golf ball, or the use of a material, such as a leuco dye, in a coating for purposes of indicating the temperature of said golf ball.

SUMMARY OF THE INVENTION

The present invention relates to new and improved golf balls that overcome the above referenced problems. In this regard, the present invention is directed to golf balls having a temperature indicating mechanism that indicates when a golf ball is at the optimum temperature for play.

In a first aspect, the present invention is directed to a golf ball comprising a core and a cover. The cover on its surface incorporates a section comprising a thermochromic material. The thermochromic material is capable of indicating whether the golf ball is above or below a predetermined temperature. The thermochromic section may be printed on the surface of the golf ball. The thermochromic material is selected from the group consisting of cholesteric liquid crystals and leuco dye systems. Preferably, at least one of a core or core layer comprises a liquid or fluid material.

In another aspect, the present invention is directed to a golf ball comprising a core and a cover. The cover incorporates on its surface an indicia that is covered with a thermochromic section. At a predetermined temperature, the thermochromic section becomes clear or translucent, thus allowing the observation of the indicia. The indicia may be a color, a readable word, a logo, or any other suitable indication that the golf ball is suitable for play. The thermochromic material is selected from the group consisting of cholesteric liquid crystals and leuco dye systems. Preferably, at least one of a core or core layer comprises a liquid or fluid material.

In another aspect, the present invention is directed to a golf ball comprising a core and a cover. The cover has one or more coating layers disposed on its surface, wherein at least one of the coating layers comprises a leuco dye distributed throughout the coating. The leuco dye in the coating layer(s) is capable of indicating whether the golf ball is above or below a predetermined temperature. The leuco dye may be in one or more coating layers, such as a top coat or primer layer, on the surface of the golf ball. In one aspect, the leuco dye changes the color of the coating at the predetermined temperature, thus allowing the observation of the dye and indicating that the ball is suitable or not suitable for play. At least one of a core or core layer preferably comprises a liquid or fluid material.

BRIEF DESCRIPTION OF THE DRAWINGS

The following is a brief description of the drawings, which are presented for the purpose of illustrating the invention and not for the purposes of limiting the same.

DETAILED DESCRIPTION OF THE PREFERRED EMBODIMENT

Figure 1:
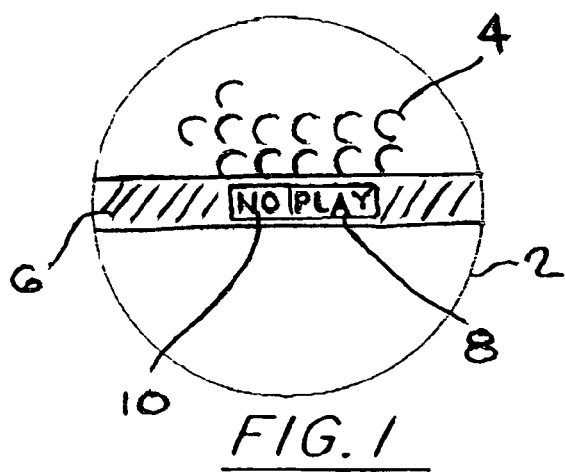
FIG. 1 is a frontal view of a golf ball showing the application of a temperature sensitive thermochromic compound onto a black stripe.

The major components of a golf ball are generally polymeric materials. A golf ball functions as a result of its ability to transfer the kinetic energy of a moving golf club head to the golf ball. The ability to transfer this kinetic energy is related to the modulus of elasticity of the various polymeric compounds that make up the components of the golf ball. The modulus of elasticity of a polymer varies with temperature. Generally, the higher the temperature within a given range, the higher the modulus of elasticity, and conversely, the lower the temperature, the lower the modulus of elasticity. Simply stated, as the temperature drops, golf balls become stiff and hence cannot be driven as far as when they are warm.

The viscosity of a fluid or gel also varies with temperature. For the most part, fluids or gels become less viscous with elevated temperatures. There are some materials that do become more viscous with an increase in temperature, such as fluid mixtures composed of water, polyvinyl alcohol and hydrated sodium borate (Borax). Therefore, it is important to determine the temperature of a golf ball that contains a fluid or a gel. The viscosity of the fluid or gel interior of a ball will have varying effects on the golf ball as the ball is struck or spun.

A golfer always strives for maximum performance from a golf ball. Maximum performance is often characterized by the length of a drive, with longer being better. In order to achieve maximum performance, a golf ball must be at an optimum temperature for playing. For practical purposes, this optimum temperature is generally from about 15 to about 35° C., although individual golfers may prefer temperatures above or below this range.

Early or late in the golf season, particularly in certain climates, golf balls can be well below these optimum temperatures. This is particularly true if golf balls have been left outside, for example in the trunk of a car, or in an unheated location. It has been found that a golf ball stored outside or in an unheated area may have a ball temperature of 0° C. or less, particularly early in the day.

Golfers have long recognized that cold golf balls do not perform well. As a way of warming golf balls golfers often place golf balls inside their clothing so that body warmth might warm the golf balls. Some golfers use electric powered golf ball warmers to warm the golf balls. Regardless of which method is used, a golfer still has no way of knowing when a golf ball is at an optimum temperature for play. This invention is concerned with a golf ball that will indicate when a golf ball is at optimum temperature for play.

In one preferred embodiment of the invention, there is a golf ball comprising a core and a cover. Preferably, the core comprises a liquid, gel or fluid filled core or core layer. The cover on its surface incorporates a section comprising a thermochromic material, wherein the thermochromic material is capable of indicating whether the golf ball is above or below a predetermined temperature. In a preferred embodiment of the invention, the golf ball is stamped with an ink which incorporates a thermochromic compound in such a manner that a positive indicia is given as to whether a ball is in condition for play or not. Any type of golf ball may be used, as long as the thermochromic material can be incorporated on or in the surface of the cover layer. In its simplest form, the stamp could indicate a word such as "PLAY" when the ball is above a predetermined temperature that would constitute an optimum condition, and "NO PLAY" when the golf ball is below said optimum temperature, but any indicia may be used as long as the golfer knows which is suitable for play and which is not suitable for play. For example, "YES" and "NO" could also be used.

Referring to FIG. 1 it can be seen that golf ball 2 has a plurality of dimples 4. Golf ball 2 incorporates a printed band 6 that is of a dark color. Printed on band 6 is a second band 8 that incorporates the indicia PLAY. While band 8 can be printed in a thermochromic compound it need not be and can be printed in normal ink. Printed on band 6 is a third band 10, which is printed with an ink that incorporates a thermochromic compound. When the temperature of ball 2 drops to a predetermined level the "NO" indicia becomes visible. This "NO" indicia indicates that the golf ball is at such a temperature that is not optimum, and it would be best not to play the golf ball.

In another embodiment, band 10 can be eliminated and band 8 would not incorporate the indicia "PLAY". Instead, band 8 would be printed with a thermochromic compound that incorporates an ink which changes color at a predetermined temperature. For example, if band 8 was one color, such as green, the golfer would know that the golf ball was in condition for play. Conversely, if band 8 was another color, such as red, the golfer would know that ball was not be in condition for play.

Figure 2:
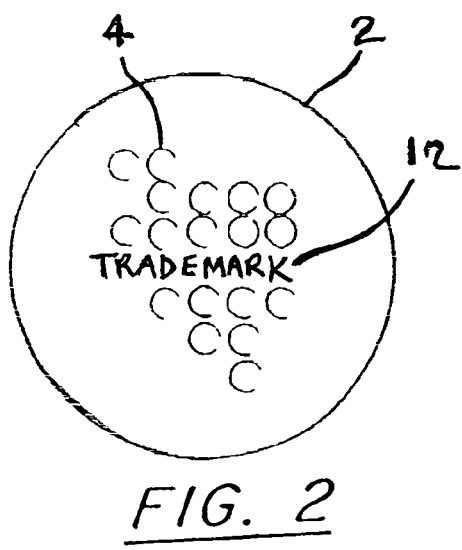
FIG. 2 is a frontal view of a golf ball showing the application of a temperature sensitive thermochromic compound as a trademark.

FIG. 2 illustrates still another embodiment of this invention wherein golf ball 2 with dimples 4 has a trademark 12 imprinted thereon. Trademark 12 is imprinted with an ink that incorporates a thermochromic compound that changes color at a given temperature. In this instance, if trademark 12 is one color, such as green, the golf ball is suitable for play. In contrast, if trademark 12 is another color such as red, this would indicate that ball is not in condition for play.

Figure 3:
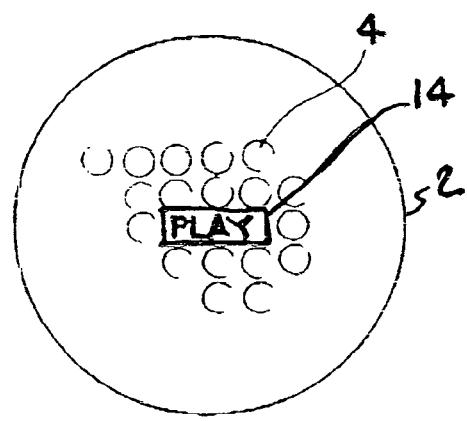
FIG. 3 is a frontal view of a golf ball showing the application of a temperature sensitive thermochromic compound as an indicia.

In another preferred embodiment, the invention comprises a golf ball comprising a core and a cover. Preferably, the core comprises a liquid, gel or fluid filled core or core layer. The cover incorporates on its surface an indicia, wherein the indicia is covered with a thermochromic section, and wherein the thermochromic section becomes clear or translucent at a predetermined temperature, thereby allowing the observation of the indicia. As shown in FIG. 3, indicia 14 is printed without a contrasting stripe. When the ball is in condition for play, indicia 14 would indicate this by, for example, displaying the word "PLAY". If the ball is not at an optimum temperature and therefore not suitable for play, the band would not show the indicia at all.

Figure 4A:
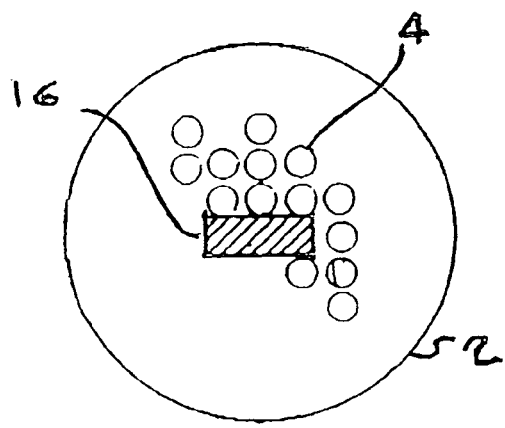
FIGS. 4A and 4B are frontal views of a golf ball before and after the temperature sensitive material becomes transparent or translucent.
Figure 4B:
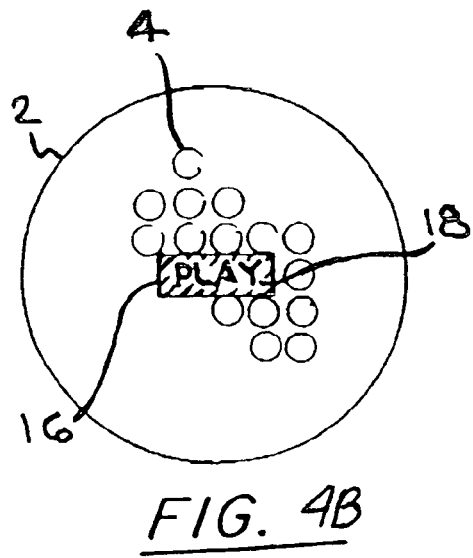

Another golf ball according to this preferred embodiment is illustrated in FIGS. 4A and 4B. A golf ball 2 having dimples 4 incorporates an indicia 16. When the temperature is too cold for play, the indicia 16 is opaque, as shown in FIG. 4A. When the temperature of golf ball is warm enough for play, the indicia 16 becomes transparent or translucent such that the indicia becomes visible, as shown in FIG. 4B.

Relative to the description of FIGS. 1, 3 and 4 above, the indicia "PLAY" and "NO PLAY" are discussed as examples for illustrative purposes only, but it is understood by one skilled in the art that other wording, symbols or marks could be utilized.

In another preferred embodiment of the invention, there is a golf ball comprising a core and a cover. Preferably, the core comprises a liquid, gel or fluid filled core or core layer. The cover has one or more coating layers disposed on its surface, wherein at least one of the coating layers comprises a leuco dye distributed throughout the coating. The leuco dye in the coating layer(s) is capable of indicating whether the golf ball is above or below a predetermined temperature. The leuco dye may be in one or more coating layers, such as a top coat or primer layer, on the surface of the golf ball.

In a preferred embodiment of the invention, the golf ball has a coating which incorporates a leuco dye in the coating in such a manner that a positive indicia is given as to whether a ball is in condition for play or not. Any type of golf ball and coating material may be used, as long as the leuco dye can be incorporated in the coating. The coating could indicate when the ball is above a predetermined temperature that would constitute an optimum condition by showing no color (therefore, remaining as a white cover), and it could change to a color, such as blue, when the golf ball is below said optimum temperature. Alternatively, the ball could have a color when it is suitable and no color when it is not. Any color and scheme may be used as long as the golfer knows which is suitable for play and which is not suitable for play.

Figure 5:
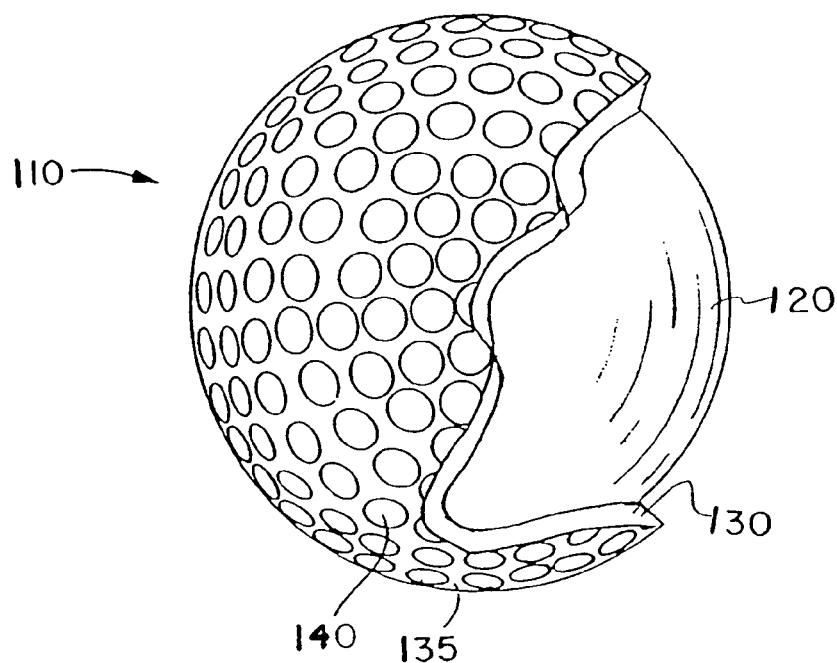
FIG. 5 is a perspective view of a golf ball having a core and a cover and a coating layer disposed on the cover.
Figure 6:
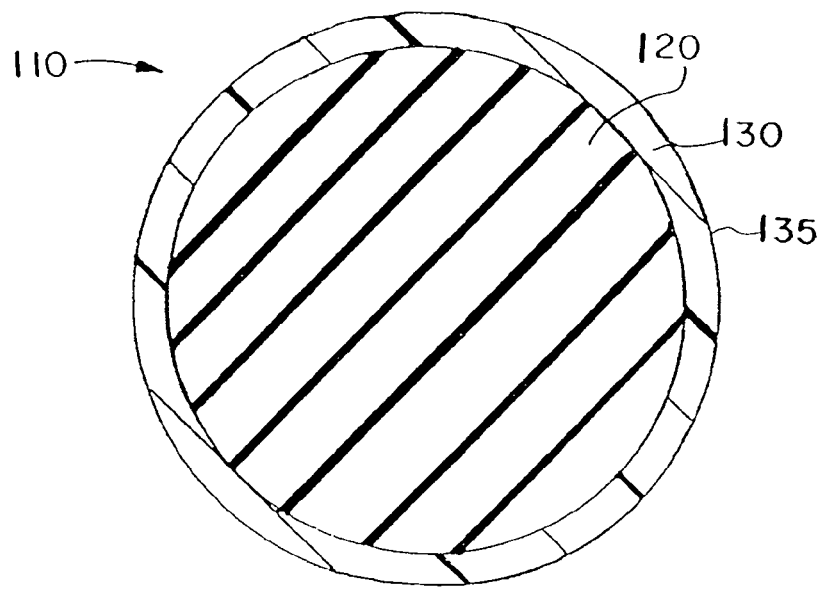
FIG. 6 is a cross section of the golf ball of FIG. 5.

Referring to FIGS. 5 and 6, it can be seen that the golf ball 110 has a core 120, a cover layer 130, dimples 140, and a coating layer 135. The cover layer 130, core 120 and coating layer 135 may each comprise multiple layers.

Figure 7:
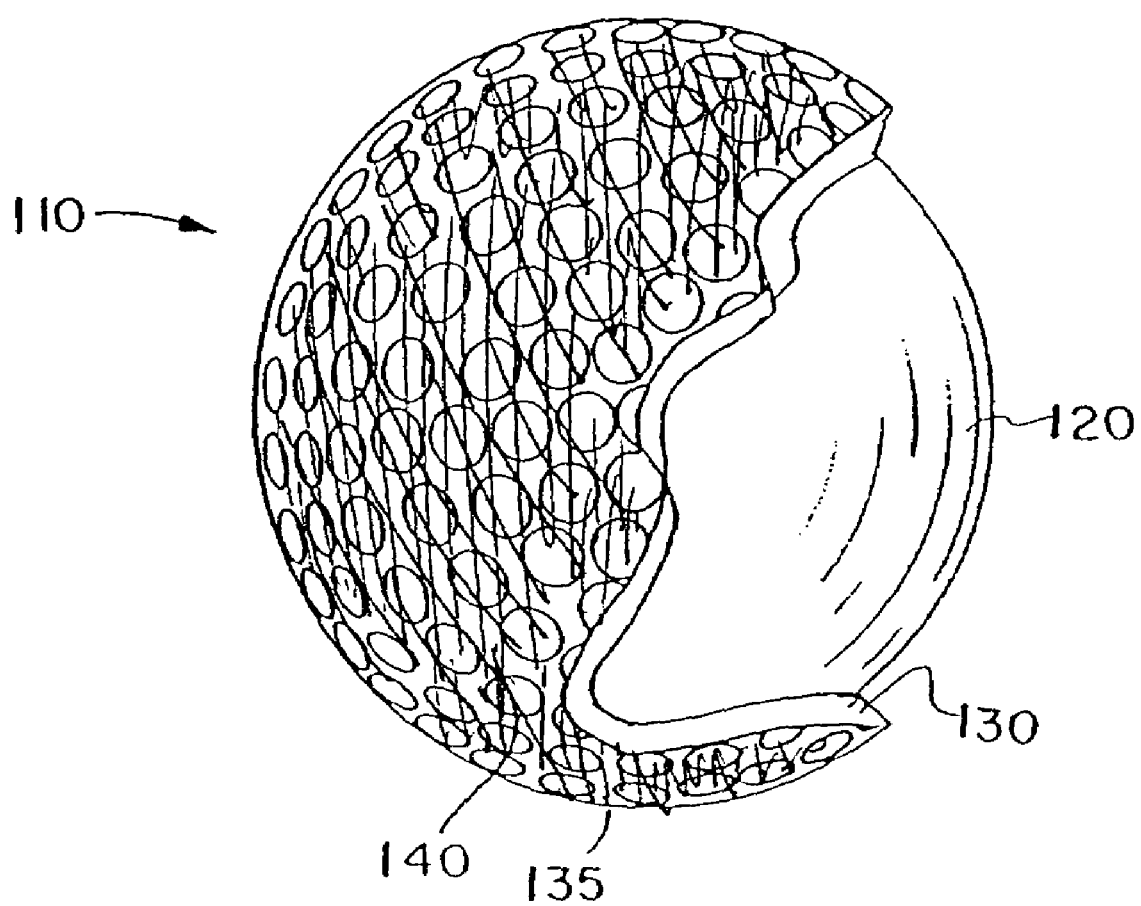
FIG. 7 shows the golf ball of FIG. 5 with a coating comprising a leuco dye.

FIG. 7 shows the golf ball of FIG. 5 wherein the coating 135 has changed to a color. In one embodiment, this would indicate that ball is not in condition for play.

The golf ball of the invention preferably comprises a cover layer disposed about the core. The cover may be a single cover layer or optionally a multi-layer cover. The cover layer is constructed from any suitable cover material known in the golf ball art. Furthermore, the mantle layers may contain a plurality of protuberances. Suitable cover materials are more fully described herein.

Additionally, it is contemplated that golf balls employing a core according to the present invention may have one or more core layers disposed thereon and one or more mantle layers disposed between the core and the cover layer or layers. Suitable mantle layer materials are more fully described herein. Preferably, the core or core layer comprises a liquid, gel or fluid material. Liquid, gel or fluid filled cores are known in the art, and any suitable material may be used. Examples of fluid materials suitable for use in the invention include, but are not limited to, water, water solutions, salt water, non-Newtonian fluids, oils, lipids, sugar syrups, solvents, mixtures of oils and water solutions, protein gels, exfoliated polymers in solution, swelled polymers such as polyacrylamide and polyacrylic acid, and the like. The fluid may be a blend of immiscible materials, and the immiscible materials may or may not be at different densities. The fluid or gel may be a dilatent material where the viscosity increases with shear or thixotropic material where the viscosity decreases with shear.

Preferred cover materials are natural and synthetic balata, various ionomers and non-ionomers, such as polyurethanes, and blends thereof. Ionomer covers and some non-ionomer covers are very durable and result in what is referred to as "cut proof" golf balls.

The cover and mantle layers of golf balls according to the present invention may comprise any material suitable for use as a golf ball mantle. Examples of preferred materials include, but are not limited to, ionomer resins, non-ionomer resins such as nylon compositions, thermoplastics compositions, thermoset compositions, and polyurethane materials.

With respect to a preferred ionomeric cover or mantle layer composition of the invention, ionomeric resins are polymers containing interchain ionic bonding. As a result of their toughness, durability, and flight characteristics, various ionomeric resins sold by E.I. DuPont de Nemours & Company under the trademark SURLYN®, and by the Exxon Corporation (see U.S. Pat. No. 4,911,451, incorporated herein by reference) under the trademarks ESCOR® and IOTEK®, have become the materials of choice for the construction of golf ball layers over the traditional "balata" (transpolyisoprene, natural or synthetic) rubbers.

The cover layer(s) can also be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR®, NUCREL®, ESCOR® and ATX, plastomers and flexomers, thermoplastic elastomers such as styrene/butadiene/styrene (SBS) or styrene/ethylene-butylene/styrene (SEBS) block copolymers, including KRATON® (Shell), dynamically vulcanized elastomers such as SANTOPRENE® (Monsanto), ethylene vinyl acetates such as ELVAX® (DuPont), ethylene methyl acrylates such as OPTEMA® (Exxon), polyvinyl chloride resins, and other elastomeric materials may be used. Mixtures, blends, or alloys involving the materials described above can be used. The cover layer(s) optionally may include processing aids, release agents and/or diluents.

The core and any core layers according to the present invention may be formed from any suitable core material known in the golf ball art. The core may be formed from a natural or synthetic rubber such as polybutadiene or polyisoprene, a thermoset material, a thermoplastic material, or combinations thereof. Additionally, the core may be a liquid, gel or fluid filled shell, such as a polymeric or metal shell filled with a liquid material, or any other liquid, gel or fluid filled core known in the art. The core may additionally comprise one or more core layers, and the one or more core layers may be formed from any of the previously described materials or other materials known in the art.

The cores generally have a weight of about 25 to 40 grams and preferably about 30 to 40 grams and can be molded from a variety of materials, as previously described and using methods known in the golf ball art.

Materials suitable for a mantle layer include any of those previously listed as materials suitable for a cover layer, as well as those suitable for a core or core layer.

Energy transfer within a golf ball is a function of the thickness of the respective layers, the size, shape and the materials used to form the respective layers. Physical properties of a golf ball of the present invention may be adjusted and optimized by varying the compositions and thickness of individual layers and also by variations in the surface topography of one or more mantle layers. A golf ball functions by the flexing of the respective core and cover layers when the golf ball is struck with a golf club. As a result of the flexing, kinetic energy is transferred from a moving golf club head to the golf ball, causing the golf ball to be propelled a great distance.

The ability of a golf ball to transfer energy from a moving golf club head to itself is controlled by the modulus of elasticity of the materials, which are generally polymers, that make up the various components of a golf ball. The modulus of elasticity of a polymer varies with temperature. Generally, the higher the temperature within a given range, the higher the modulus of elasticity. In view of this, it is therefore desirable that a golf ball be played under optimum temperature conditions. This invention provides a qualitative indication of the golf ball temperature, thereby allowing a golfer to determine when a golf ball is at the optimum temperature for play.

In one embodiment, the golf balls of the present invention incorporate in or on the surface of the golf ball a thermochromic compounds, such as cholesteric liquid crystals, a leuco dye system or a combination thereof.

The thermochromic compound may be placed over another printed area, such as, for example, a black stripe or printed words. As the temperature of the golf ball changes, the thermochromic compound changes color or becomes translucent or transparent. This change in color is useful to indicate when the golf ball is at the optimum temperature for play.

The thermochromic compound may be printed in such a manner as to present a readable indication of the condition of the golf ball. For example, various different thermochromic compounds can be chosen and printed to indicate a "NO PLAY" condition at one temperature and a "PLAY" condition at another temperature.

In the manufacture of golf balls, the last step in the manufacturing process is generally a painting or finishing step. In some instances, a semi finished ball is printed and clear coated. In many cases, the semi finished golf ball is primed, painted if necessary, printed and clear coated. Many covers do not need to be painted if pigments and optical brighteners are utilized. See, for example, U.S. Pat. No. 4,679,795 to Melvin et al., incorporated by reference herein. In one embodiment of this invention, the application of the thermochromic compound is after the above described priming or printing step. The printing is then covered and protected with a clear coat. The thermochromic material may be put on in different steps as well, as described below.

In accordance with another embodiment of the invention, the thermochromic indicia may be applied over the clear coat. In this embodiment, the thermochromic indicia may be composed of a durable ink such as a two part polyurethane system or an ultraviolet cured oligomer type ink, or any other ink or printing system known in the art.

In still another embodiment, the thermochromic indicia may be applied directly to the cover of the golf ball, provided that steps are taken to make sure that proper adhesion occurs between the thermochromic indicia and the golf ball surfaces. The cover may then be clear coated, if desired.

In another embodiment, the golf balls of the present invention incorporate in one or more coating layers a leuco dye or leuco dye system. As the temperature of the golf ball changes, the leuco dye changes color or becomes translucent or transparent. In one embodiment, the leuco dye changes to a visible color, indicating the ball is not suitable for play, and in another embodiment, the leuco dye may become transparent when it is not suitable for play. This change in color is useful to indicate when the golf ball is at the optimum temperature for play. One or more additional indicia may be used in combination with the indication in the coating layer. For example, the ball may have a stamp with a logo or a word indicating that it is fit for use, or some other indicia, in addition to the color changing coating layer.

In one embodiment of this invention, the leuco dye is incorporated into a primer coat. In another embodiment, the leuco dye is incorporated into the topcoat. The leuco dye may also be incorporated into two or more layers, such as in a primer layer and a topcoat layer or two or more topcoat layers.

Leuco dye systems measure temperature change less precisely than other thermochromic compounds, such as cholesteric liquid crystals. When a leuco dye system is utilized as a thermochromic compound, the temperature response of the indicia on the golf ball is less precise.

However, the leuco dye system is much more solvent resistant and less ultraviolet sensitive, and therefore it is preferred for use in coatings for golf balls.

Thermochromic leuco dye systems are also referred to as "white dyes". They are named such due to the colorless state that they are in under certain conditions (i.e. pH, temperature, UV radiation). These leuco dye systems are typically used in a microencapsulated multi component mixture. Generally, the first component of the leuco dye system is a spirolactone such as fluorans or crystal violet lactone, spiropyrans or fulgides.

The second component is generally a color developer. The color developer is often referred to as an "electron acceptor", but it is more accurately described as a proton donor that can affect the equilibrium of the dye system. The color developer is typically a weak acid. Examples that may be suitable for use in the present invention include, but are not limited to, bisphenol A, 1,2,3 triazoles (such as 1,2,3-benzotriazole and 1,2,3-triazole ethyl 4-methyl-5-carboxylate), octyl phydroxybenzoate and 4-hydroxycoumarin derivatives.

The third component of the leuco dye system is generally a polar solvent. Examples of polar solvents include, but are not limited to, lauryl alcohol, cetyl alcohol and butyl stearate. The polar solvent is an important component since it is the melting point of this component that controls the temperature at which the color change will take place.

These microencapsulated materials are typically colored at low temperatures (below the melting point of the solvent) and colorless at higher temperatures.

An example of a leuco dye system is one that generally contains the following components:
1. leuco dye (such as crystal violet lactone);
2. weak acid (such as 1,2,3-benzotriazole);
3. solvent (such as lauryl alcohol); and optionally
4. salt (such as myristylammonium oleate).

The salt dissociates at high temperature into amine and carboxylic acids, and this dissociation raises the pH of the system and causes the dye to take up its colorless closed-ring form.

In the microencapsulated state, these leuco dye systems are the preferred embodiment for use in this invention.

EXAMPLES

The present invention will be described in greater detail with reference to the following Examples. All formulations listed in the Examples are parts by weight unless otherwise specified.

Example 1

A golf ball having an ionomer cover was primed by spraying approximately a 1 mil coating of a primer having the following composition in parts by weight.

| | |
|---|---|
| Polyurethane dispersion | 100.0 |
| Polyaziridine - crosslinker | 5.0 |
| Water | 5.0 |
| Total: | 110.0 |

The primer coating was then dried for 20 minutes at temperature of about 50° C. A black band was then applied around the ball. The black band consisted of a carbon pigment in an ultraviolet cured ink. This black band was then cured for 2 minutes using ultraviolet radiation.

A thermochromic logo of the cholesteric liquid crystal type was then printed over a portion of the black band. The color at optimum temperature was green. The liquid crystal printing ink is commercially available from the Hallcrest Limited Company (Glenview, Ill.) as C-17-10 TLC.

The golf ball was then air dried at a temperature of 120° F. for 20 minutes. The resulting golf ball was then cooled to a temperature of 10° C. The thermochromic logo was black. The golf ball was then slowly reheated at a temperature of 25° C. where upon the logo changed to a green color. The printed green thermochromic logo strongly contrasted against the black stripe.

Example 2

A golf ball primed with a waterborne primer was printed with the word "MAN" using a UV cured black ink. A thermochromic ink containing a leuco dye system was printed over the "MAN" indicia. The formula of the thermochromic ink was:

| | |
|---|---|
| Leuco dye Powder (Green 31 Ct) | 100 grams |
| Polyurethane dispersion | 20.0 grams |
| Defoamer | 4 drops |
| Deionized water | 2.0 grams |

The leuco dye powders are commercially available from Color Change Corporation, Addison, Ill.

Although the formulation is proprietary, Applicant believes that the leuco dye powder was a microencapsulated, multi component material containing at least a dye, a color developer and a solvent. Applicant speculates that the leuco dye powder may also contain a salt that dissociates at high temperature, changing the pH of the system.

This overprint, thermochromic ink was dried for 20 minutes at 120° F. The resultant ink was green and opaque when dried at 25° C. When the ball was heated to 35° C., the green thermochromic ink became transparent and the "MAN" indicia became visible.

Example 3

A blue leuco dye system was incorporated into a standard topcoat formulation. The topcoat formulation was a solvent based, aliphatic polyester urethane system, and 0.5% by weight of a blue leuco dye (Powder Blue 31 CT) was added to the coating. The leuco dye powders are commercially available from Color Change Corporation, Addison, Ill. Standard golf balls were coated with the topcoat using standard manufacturing techniques (spraying) and allowed to dry. The golf balls were then exposed to higher temperatures. The topcoat of the golf balls of the invention changed from blue to clear when exposed to temperatures in the range of 70 to 100° F. with an average of 88° F. Other leuco dye systems can also be used, depending on the desired temperature range. For example, there are leuco dye systems that can change from a color to a clear (or invisible) at temperatures as low as about 23° F. or that do not change until they reach a temperature of about 140° F. Therefore, depending on the desired application, location, and the like, the appropriate leuco dye can be selected. Although a blue leuco dye was used in this example, any desired color or combination of colors can be used. Two or more dyes that change color at different temperatures could be used to indicate various ranges of temperature.

Although the formulation is proprietary, Applicant believes that the leuco dye powder was a microencapsulated, multi component material containing at least a dye, a color developer and a solvent. Applicant speculates that the leuco dye powder may also contain a salt that dissociates at high temperature, changing the pH of the system.

The foregoing description is considered to describe the preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalents.

The invention claimed is:

1. A golf ball comprising a core and a cover wherein said cover on its surface incorporates a section comprising a thermochromic material, wherein the thermochromic material is capable of visually indicating whether the golf ball is above or below a predetermined temperature, further wherein a first section comprising an ink material is first created on the surface of said golf ball, the thermochromic section is applied over the first section, and wherein the color of the ink material is different from the color of the thermochromic section, wherein the visible indication is in two parts, wherein the first part is permanently displayed, and the second part is displayed after activation by a temperature change.

2. The golf of claim 1 wherein the thermochromic material is a member selected from the group consisting of cholesteric liquid crystals and leuco dye systems.

3. The golf ball of claim 1, wherein the cover comprises at least one inner cover layer and at least one outer cover layer.

4. The golf ball of claim 1, wherein the core comprises a liquid, gel or fluid filled core or core layer.

5. A golf ball comprising a core and a cover, the cover comprising at least one inner cover layer and at least one outer cover layer, wherein said cover incorporates on its surface an indicia, wherein the indicia is covered with a thermochromic section, and wherein the thermochromic section becomes clear or translucent at a predetermined temperature, thereby allowing the observation of the indicia, wherein the indicia is a color, a readable word or a logo.

6. The golf ball of claim 5 wherein the core comprises a liquid, gel or fluid filled core or core layer.

7. The golf ball of claim 5, further comprising a temperature indicating mark printed on the cover.

* * * * *